(12) United States Patent
Yang et al.

(10) Patent No.: US 10,581,823 B2
(45) Date of Patent: Mar. 3, 2020

(54) WEB CLIENT PLUGIN MANAGER IN VCENTER MANAGED OBJECT BROWSER

(71) Applicant: VMware, Inc., Palo Alto, CA (US)

(72) Inventors: Yang Yang, Shanghai (CN); Zhongping Lu, Shanghai (CN); Jin Feng, Shanghai (CN); Shugang Guo, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 504 days.

(21) Appl. No.: 15/076,633

(22) Filed: Mar. 21, 2016

(65) Prior Publication Data
US 2017/0272420 A1   Sep. 21, 2017

(51) Int. Cl.
| | |
|---|---|
| *H04L 29/06* | (2006.01) |
| *H04L 29/08* | (2006.01) |
| *G06F 8/65* | (2018.01) |
| *G06F 9/455* | (2018.01) |

(52) U.S. Cl.
CPC .............. *H04L 63/08* (2013.01); *G06F 8/65* (2013.01); *G06F 9/45533* (2013.01); *H04L 67/02* (2013.01); *H04L 67/141* (2013.01); *H04L 67/34* (2013.01); *H04L 67/42* (2013.01); *G06F 9/45558* (2013.01)

(58) Field of Classification Search
CPC ....... H04L 63/08; H04L 67/02; H04L 67/141; H04L 67/34; H04L 67/42; G06F 8/65; G06F 9/45533; G06F 9/45558
See application file for complete search history.

(56) References Cited

U.S. PATENT DOCUMENTS

| | | | | |
|---|---|---|---|---|
| 7,730,486 | B2 * | 6/2010 | Herington | G06F 9/5077 709/223 |
| 8,819,673 | B1 * | 8/2014 | Wilkinson | G06F 9/45558 718/1 |
| 9,065,725 | B1 * | 6/2015 | Nanda | H04L 43/04 |
| 9,065,854 | B2 * | 6/2015 | Goyal | G06F 9/455 |
| 9,100,297 | B2 * | 8/2015 | DeHaan | H04L 41/0809 |
| 9,148,428 | B1 * | 9/2015 | Banga | G06F 9/5027 |
| 9,398,066 | B1 * | 7/2016 | Roth | H04L 67/2852 |
| 9,471,533 | B1 * | 10/2016 | Roth | G06F 15/167 |
| 9,491,161 | B2 * | 11/2016 | Suresh | H04L 67/025 |
| 9,531,714 | B2 * | 12/2016 | Innes | G06F 21/31 |
| 9,667,610 | B2 * | 5/2017 | Theebaprakasam | H04L 63/08 |

(Continued)

*Primary Examiner* — Joseph P Hirl
*Assistant Examiner* — Stephen T Gundry
(74) *Attorney, Agent, or Firm* — Su IP Consulting

(57) ABSTRACT

A method is provided for a plug-in manager in a virtual machine (VM) system to install or update a plug-in at a web client server in the VM system. The plug-in extends the web client server with a user interface element to interact with a management entity implemented as a VM in the VM system. The method includes receiving, from the management entity, a request to register or update the plug-in, wherein the request includes an address and authentication information for the management entity, recording the address and the authentication information, transmitting, to the web client server, an instruction to install or update the plug-in, receiving, from the plug-in at the web client server, a request for the address and the authentication information for the management entity, and transmitting, to the plug-in at the web client server, the address and the authentication information for the management entity.

26 Claims, 4 Drawing Sheets

(56) References Cited

U.S. PATENT DOCUMENTS

| | | | |
|---|---|---|---|
| 9,686,255 B2* | 6/2017 | Rafiq | H04L 63/08 |
| 9,692,640 B1* | 6/2017 | Veladanda | H04L 41/0803 |
| 9,703,588 B2* | 7/2017 | Yang | G06F 9/45558 |
| 9,866,529 B2* | 1/2018 | Khanal | H04L 63/0272 |
| 9,917,865 B2* | 3/2018 | Arora | H04L 65/1069 |
| 9,921,860 B1* | 3/2018 | Banga | G06F 9/45533 |
| 2003/0167320 A1* | 9/2003 | Perez | G06F 8/656 709/223 |
| 2005/0081055 A1* | 4/2005 | Patrick | G06F 21/6218 726/26 |
| 2007/0239730 A1* | 10/2007 | Vigelette | G06F 21/305 |
| 2011/0126192 A1* | 5/2011 | Frost | G06F 8/61 717/178 |
| 2011/0295988 A1* | 12/2011 | Le Jouan | G06F 21/31 709/223 |
| 2012/0023558 A1* | 1/2012 | Rafiq | H04L 63/08 726/6 |
| 2012/0036178 A1* | 2/2012 | Gavini | G06F 9/5027 709/203 |
| 2012/0198328 A1* | 8/2012 | Kiley | G06F 17/30867 715/234 |
| 2013/0151515 A1* | 6/2013 | Davis | G06Q 50/01 707/736 |
| 2013/0246944 A1* | 9/2013 | Pandiyan | G06F 9/54 715/760 |
| 2013/0268357 A1* | 10/2013 | Heath | H04L 63/00 705/14.53 |
| 2013/0318199 A1* | 11/2013 | Le Jouan | H04L 67/02 709/217 |
| 2013/0332511 A1* | 12/2013 | Hala | H04L 67/34 709/203 |
| 2014/0108665 A1* | 4/2014 | Arora | H04L 67/141 709/227 |
| 2014/0304325 A1* | 10/2014 | Khanal | H04L 63/0272 709/203 |
| 2015/0089579 A1* | 3/2015 | Manza | H04L 63/0838 726/1 |
| 2015/0121061 A1* | 4/2015 | Goyal | G06F 9/455 713/152 |
| 2015/0244585 A1* | 8/2015 | Birk | H04L 67/10 726/23 |
| 2015/0288768 A1* | 10/2015 | Goyal | G06F 9/455 709/228 |
| 2015/0341383 A1* | 11/2015 | Reddy | H04L 63/0245 726/22 |
| 2015/0381621 A1* | 12/2015 | Innes | G06F 21/31 726/7 |
| 2016/0048400 A1* | 2/2016 | Yang | H04L 67/34 718/1 |
| 2016/0062783 A1* | 3/2016 | Falkco | G06F 9/45558 718/1 |
| 2016/0094539 A1* | 3/2016 | Suresh | H04L 67/025 726/7 |
| 2016/0094546 A1* | 3/2016 | Innes | H04L 63/0823 713/156 |
| 2016/0154539 A1* | 6/2016 | Buddhiraja | G06F 9/45558 715/738 |
| 2016/0188898 A1* | 6/2016 | Karinta | G06F 16/172 726/4 |
| 2016/0191645 A1* | 6/2016 | Hayton | G06F 9/445 709/203 |
| 2016/0234196 A1* | 8/2016 | Fausak | H04L 12/4679 |
| 2016/0241438 A1* | 8/2016 | Sundaram | H04L 41/0806 |
| 2016/0269203 A1* | 9/2016 | Hinohara | H04N 7/152 |
| 2016/0330230 A1* | 11/2016 | Reddy | H04L 63/1433 |
| 2016/0381080 A1* | 12/2016 | Reddem | H04L 63/0884 726/1 |
| 2017/0034127 A1* | 2/2017 | Singleton, IV | H04L 63/0236 |
| 2017/0048252 A1* | 2/2017 | Straub | H04L 67/10 |
| 2017/0048319 A1* | 2/2017 | Straub | H04L 67/2847 |
| 2017/0200122 A1* | 7/2017 | Edson | G06Q 10/101 |
| 2017/0331789 A1* | 11/2017 | Kumar | H04L 63/0272 |
| 2017/0339247 A1* | 11/2017 | Tiwari | H04L 67/2833 |
| 2017/0339250 A1* | 11/2017 | Momchilov | H04L 67/34 |
| 2017/0339563 A1* | 11/2017 | Singleton, IV | H04W 12/08 |
| 2018/0007059 A1* | 1/2018 | Innes | G06F 21/33 |

* cited by examiner

WEB CLIENT PLUGIN MANAGER IN VCENTER MANAGED OBJECT BROWSER

BACKGROUND

Virtualization allows the abstraction of hardware resources and the pooling of these resources to support multiple virtual machines (VMs). For example, through virtualization, VMs with different operating systems may be run on the same physical machine. Each virtual machine is provisioned with virtual resources that provide similar functions as the physical hardware of a physical machine, such as central processing unit (CPU), memory, and network resources to run an operating system and different applications.

VMware vSphere is suite of virtualization software for implementing and managing VM infrastructure. The software includes vSphere hypervisors that implement VMs on host computers, vCenter Server that centrally provisions and manages vSphere objects such as the VMs and the host computers, and vSphere Web Client (server) that allows web browser access to the vCenter Server, a management server, or a virtual appliance.

The vSphere Web Client (server) consists of a user interface layer and a service layer. The user interface layer consists of an Adobe Flex application that is displayed in the user's web browser. The Flex application contains all of the user interface elements with which the user interacts to view data on vSphere objects, send commands, and make changes to the vSphere environment.

The service layer is a collection of Java services that communicate with the vCenter Server and other parts of the vSphere environment, as well as other remote data sources. The Java services gather monitoring data on the virtual infrastructure, which is in turn displayed to the user by the Flex user interface layer. When the user performs an action from the Flex user interface, such as a management or administration command, the Java services perform that command on the virtual infrastructure. Although Flex and Java are mentioned, the vSphere Web Client (server) may be implemented in other programming languages.

DETAILED DESCRIPTION

Figure 1:
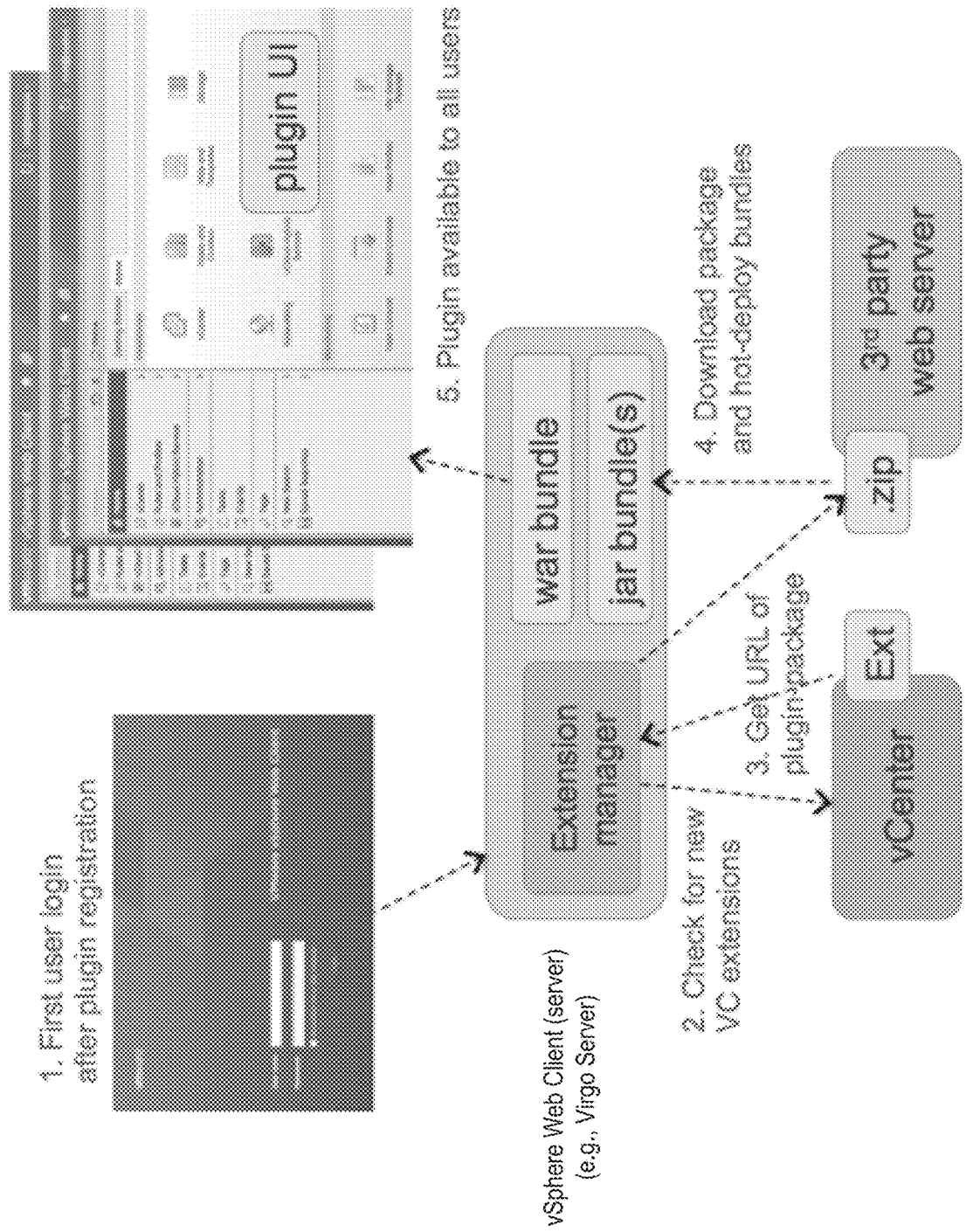
FIG. 1 is a diagram illustrating the process of deploying a plug-in package to a web client server.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

A vSphere Web Client (server) is extended by deploying plug-in packages. For example, a new management server or a virtual appliance (hereafter referred to as a "management entity") in the vSphere environment may come with a plug-in package that adds graphical user interface (GUI) elements and services to the vSphere Web Client (server) for interacting with the new management entity. The management entity provides one or more functionalities in managing or monitoring objects in the virtual environment. The plug-in package is a ZIP archive file that contains plug-in modules and a package manifest. The package manifest describes deployment information for the plug-in package using XML metadata. An extension manager in the vSphere Web Client (server) uses this metadata to install and deploy the plug-in modules in the plug-in package.

FIG. 1 illustrates the process of deploying a plug-in package to a vSphere Web Client (server). A user first registers the plug-in package as an extension for vCenter Server. Once registered, the plug-in becomes available to the vSphere Web Client (server) when it connects to the vCenter Server. When the vSphere Web client (server) establishes a user session to the vCenter Server, the vSphere Web Client (server) queries the vCenter Server for a list of all available plug-in packages that are registered as vCenter extensions. The vSphere Web Client (server) downloads and installs any new plug-in package. The new plug-in package may be located at the vCenter Server or a third party web server.

In the vCenter Server, the registered extension for the vSphere Web Client (server) functions mainly to store a URL for downloading the plug-in package. For complicated plug-in management, it is desirable to have a dedicated plug-in manager.

The plug-in package has to be updated whenever the reference ID, the address (URL), or the SSL thumbprint of the management entity changes. The plug-in package is also vulnerable to intentional or unintentional changes by others. Thus, it is desirable to remove the reference ID, the address, and the SSL thumbprint from the plug-in package and have the plug-in query the dedicated plug-in manager for the information.

The vSphere Web Client (server) has to query the vCenter Server for all the registered vCenter Server extensions in each user session to make sure all the vSphere Web Client (server) related plug-in's are installed. This is a consuming process, especially since most of the registered extensions are unrelated to the vSphere Web Client (server). Thus, it is desirable to have the dedicated plug-in manager push new plug-ins to the vSphere Web Client (server).

Figure 2:
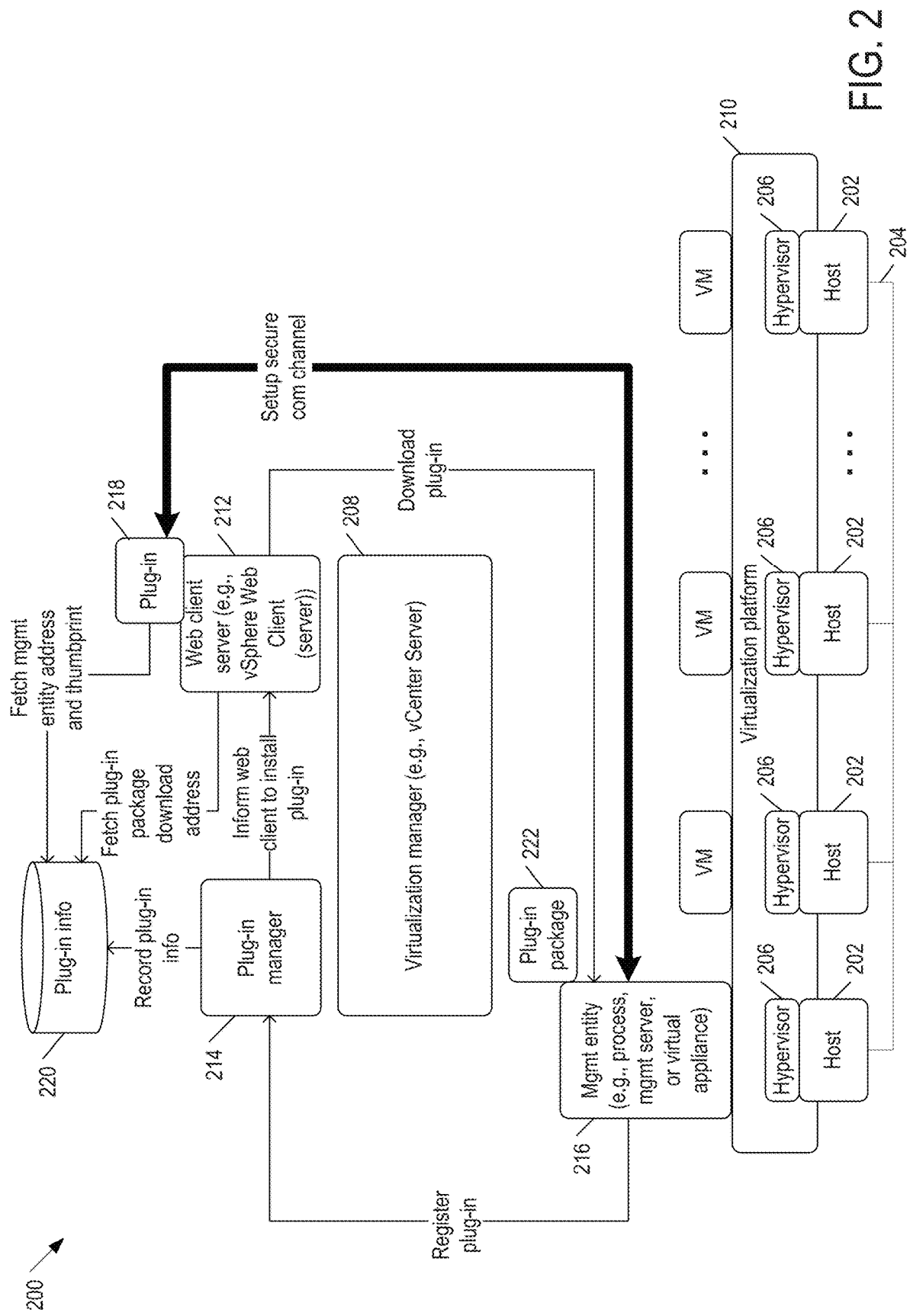
FIG. 2 is a block diagram illustrating a simplified view of a virtual machine (VM) system 200 in examples of the present disclosure.

FIG. 2 is a block diagram illustrating a simplified view of a virtual machine (VM) system 200 in examples of the present disclosure. VM system 200 includes virtualization host computers 202, also referred to as hosts 202. Hosts 202 are coupled through a network 204. Each host 202 includes physical memory, processor, local storage, and network interface cards (NICs). Each host 202 runs a hypervisor 206 to create and run VMs. A virtualization manager 208 centrally provisions and manages virtual and physical objects in VM system 200, such as VMs, clusters, and hosts. Virtualization manager 208 may run on one of hosts 202 or a dedicated host (not shown) coupled by network 204 to hosts 202. Together hypervisors 206 and virtualization manager 208 provide a virtualization platform 210 that can implement information technology services such as web services, database services, and data processing services. Hypervisor 206 may be VMware vSphere ESXi hypervisor, and virtualization manager 208 may be VMware vCenter Server.

System 200 includes a web client server 212, a plug-in manager 214, and a management entity 216. Web client server 212 allows web browser access to VM manager 208 and management entities, such as management entity 216. Plug-in manager 214 adds, updates, and removes plug-ins at web client server 212, which extends the web client server with GUIs for interacting with the management entities. For example, a plug-in 218 extends web client server 212 with one or more GUI elements for interacting with management entity 216. Web client server 212 may be vSphere Web Client (server). Management entity 216 may be a virtual appliance implemented on virtualization platform 210 (e.g., Hitachi Storage plug-in for VMware vCenter), or a process or management server in virtualization manager 208 (e.g., VMware Virtual SAN Health Check Plugin).

Figure 3:
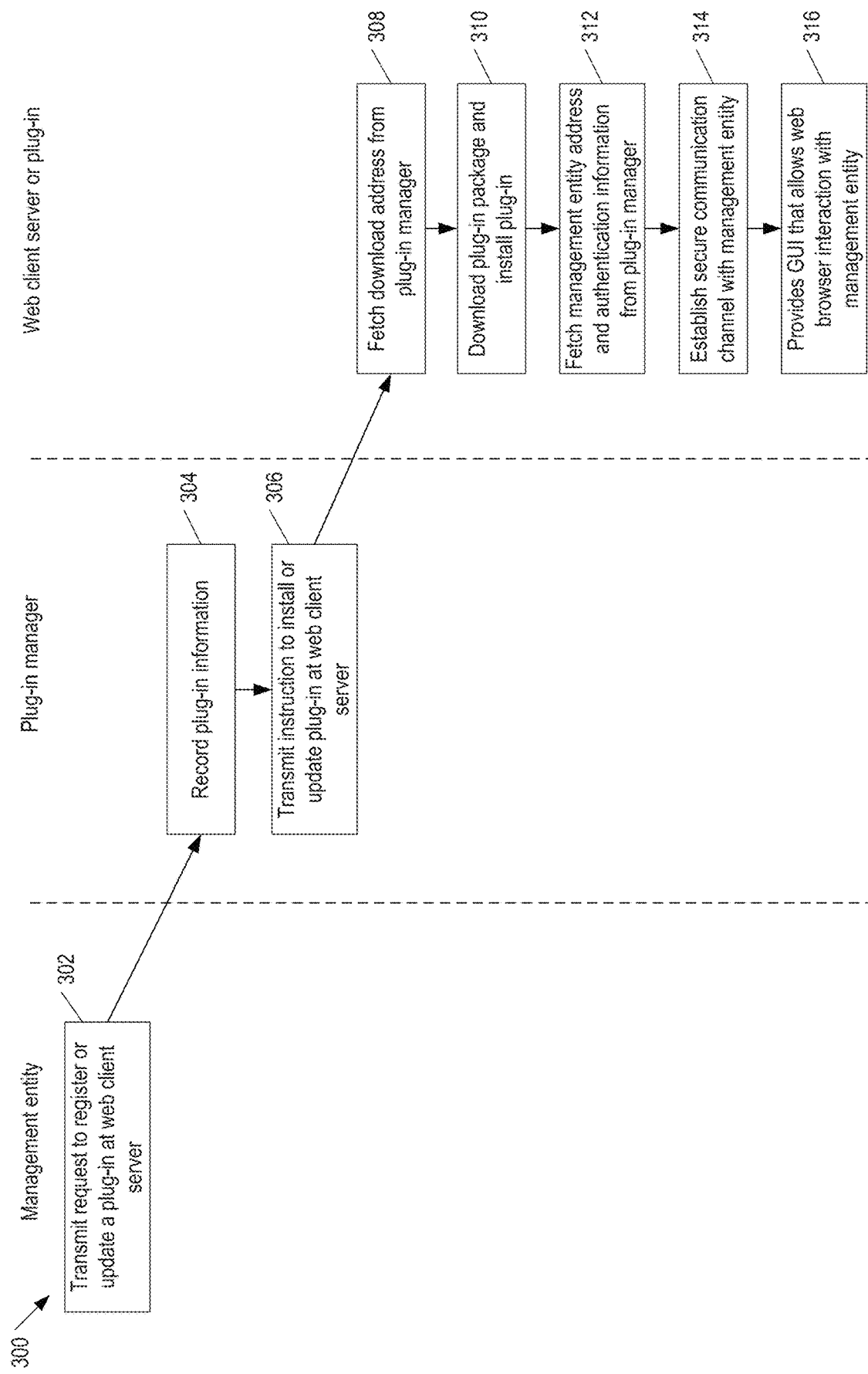
FIG. 3 show a block diagram of a method for the VM system of FIG. 2 to install or update a plug-in at a web client server through a plug-in manager in examples of the present disclosure.

FIG. 3 show a block diagram of a method 300 for VM system 200 to install or update plug-in 218 at web client server 212 through plug-in manager 214 in examples of the present disclosure. Method 300 may be executed by host processors executing computer readable codes of management entity 216, plug-in manager 214, web client server 212, and plug-in 218. Method 300 may begin in block 302.

In block 302, management entity 216 transmits a request to register or update plug-in 218 to plug-in manager 214. The request includes an address (e.g., an URL) to download a plug-in package 222 (FIG. 2) for plug-in 218, an address (e.g., an URL) of management entity 216, and authentication information for management entity 216. The authentication information may be a fingerprint or a thumbprint of a digital certificate (e.g., SSL) for management entity 216. Block 302 may be followed by block 304.

In block 304, plug-in manager 214 assigns a reference ID for management entity 216 and records the received information along with the reference ID as plug-in information in a storage 220 (FIG. 2), such as a database. Block 304 may be followed by block 306.

In block 306, plug-in manager 214 transmits an instruction to install or update plug-in 218 to web client server 212. The instruction includes the reference ID assigned to management entity 216. Block 306 may be followed by block 308.

In block 308, web client server 212 fetches the download address for plug-in package 222 from plug-in manager 214. For example, web client server 212 transmits a request for the download address for plug-in package 222 to plug-in manager 214, and plug-in manager 214 transmit the download address back to web client server 212. The request includes the reference ID assigned to management entity 216, which plug-in manager 214 uses to send the appropriate download address for plug-in package 222. Block 308 may be followed by block 310.

In block 310, web client server 212 downloads plug-in package 222 from the download address, extracts its contents, and installs plug-in 218. Block 310 may be followed by block 312.

In block 312, the extracted and installed plug-in 218 fetches the address and the authentication information for management entity 216 from plug-in manager 214. For example, plug-in 218 transmits a request for the address and the authentication information for management entity 216 to plug-in manager 214, and plug-in manager 214 transmits the reference ID and the authentication information back to plug-in 218. The request includes the reference ID assigned to management entity 216, which plug-in manager 214 uses to send the appropriate address and authentication information for management entity 216. Block 312 may be followed by block 314.

In block 314, plug-in 218 uses the address and the authentication information for management entity 216 to establish a secured connection with management entity 216. For example, plug-in 218 uses the thumbprint to authenticate communication with management entity 216. Block 314 may be followed by block 316.

In block 316, plug-in 218 provides one or more GUI elements through web client server 212 that allows web browser interaction with management entity 216. For example, plug-in 218 receives input from a browser through the GUI, provides the input to management entity 216 over the secured connection, receives output from management entity 216 over the secured connection, and updates the GUI based on the output.

Figure 4:
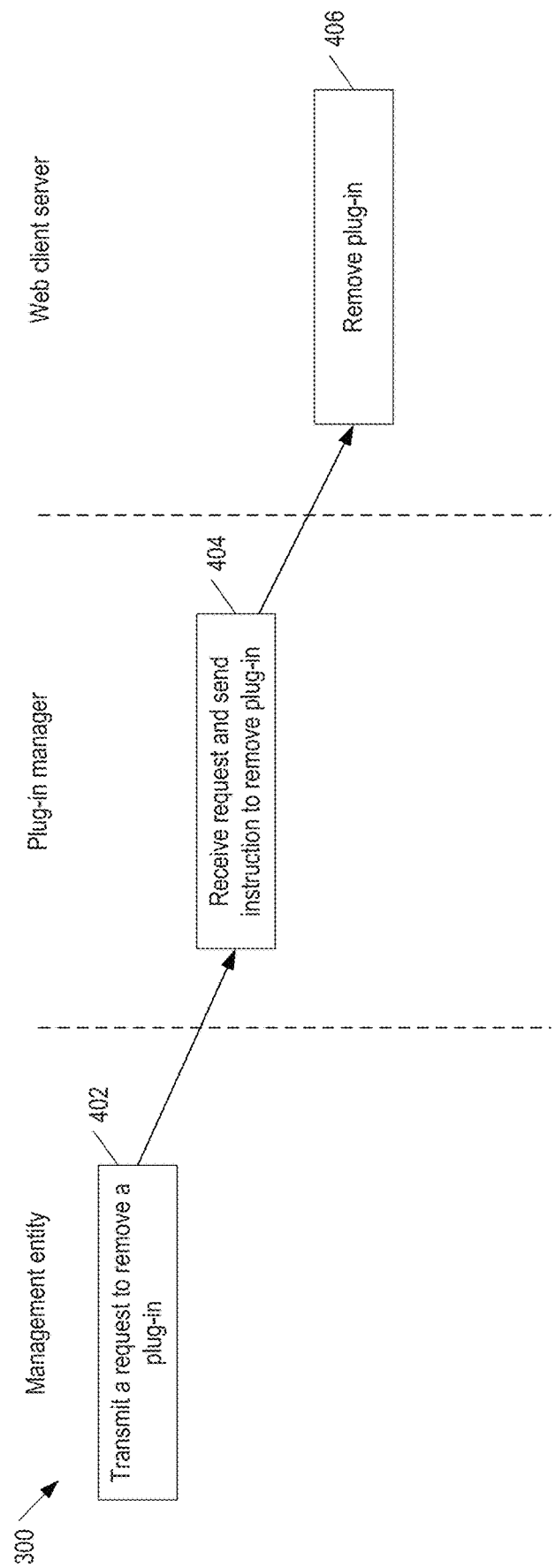
FIG. 4 show a block diagram of a method for the VM system of FIG. 2 to remove a plug-in at a web client server through a plug-in manager in examples of the present disclosure.

FIG. 4 show a block diagram of a method 400 for VM system 200 to remove plug-in 218 at web client server 212 through plug-in manager 214 in examples of the present disclosure. Method 400 may be executed by host processors executing computer readable codes of management entity 216, plug-in manager 214, and web client server 212. Method 400 may begin in block 402.

In block 402, management entity 216 or another entity sends a request to remove plug-in 218 from web client server 212. The request includes the reference ID for management entity 216, which plug-in manager 214 uses to identify plug-in 218. Block 402 may be followed by block 404.

In block 404, plug-in manager 214 receives the request to remove plug-in 218 and sends an instruction to remove plug-in 218 to web client server 212. The request includes the reference ID for management entity 216, which web client server 212 uses to identify plug-in 218. Block 404 may be followed by block 406.

In block 406, web client server 212 removes plug-in 218.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a plug-in manager in a virtual machine (VM) system to install or update a plug-in at a web server in the VM system, the method comprising:

receiving, from a management entity in the VM system, a request to register or update the plug-in configured to extend the web server with a user interface element to interact with the management entity, wherein the request includes an address and authentication information for the management entity and a download address for a plug-in package;

recording the address and the authentication information;

transmitting, to the web server, an instruction to install or update the plug-in;

receiving, from the plug-in at the web server, a request for the address and the authentication information for the management entity; and transmitting, to the plug-in at the web server, the address and the authentication information for the management entity.

2. The method of claim 1, the method further comprises:
receiving, from the web server, a request for the download address; and
transmitting, to the web server, the download address.

3. The method of claim 1, wherein the authentication information comprises a thumbprint for the management entity.

4. The method of claim 1, wherein the management entity comprises a virtual appliance implemented as a VM in the VM system or a management server on a virtualization manager in the VM system.

5. The method of claim 1, further comprising:
receiving, from the management entity, a request to remove the plug-in; and
sending, to the web server, an instruction to remove the plug-in.

6. A method for a web server in a virtual machine (VM) system to add or update a plug-in from a management entity in the VM system, the method comprising:
receiving, from a plug-in manager, an instruction to install or update the plug-in configured to extend the web server with a user interface element to interact with the management entity;
receiving, from the plug-in manager, a download address for a plug-in package;
downloading the plug-in package for the plug-in based on the download address;
installing the plug-in from the plug-in package;
transmitting, to the plug-in manager, a request for an address and authentication information for the management entity;
receiving, from the plug-in manager, the address and the authentication information for the management entity; and
using the address and the authentication information for the management entity, establishing a secured connection with the management entity.

7. The method of claim 6, further comprising:
transmitting, to the plug-in manager, a request for the download address for the plug-in package.

8. The method of claim 6, wherein the authentication information comprises a thumbprint for the management entity.

9. The method of claim 6, wherein the management entity comprises a virtual appliance implemented as a VM in the VM system or a management server on a virtualization manager in the VM system.

10. The method of claim 6, further comprising:
receiving, through the user interface element, input from a browser;
providing the input to the management entity;
receiving output from the management entity; and
updating the user interface element based on the output.

11. A method for a virtual machine (VM) system to install or update a plug-in at a web server in the VM system through a plug-in manager in the VM system, the method comprising:
a management entity in the VM system transmitting, to the plug-in manager, a request to register or update the plug-in configured to extend the web server with a user interface element to interact with the management entity, wherein the request comprising an address and authentication information of the management entity;
the plug-in manager recording the address and the authentication information;
the plug-in manager transmitting, to the web server, an instruction to install or update the plug-in;
the plug-in manager transmitting, to the web server, a download address for a plug-in package;
the web server downloading the plug-in package for the plug-in based on the download address and installing the plug-in from the plug-in package;
the plug-in transmitting, to the plug-in manager, a request for the address and the authentication information for the management entity;
the plug-in manager transmitting, to the plug-in, the address and the authentication information for the management entity; and
using the address and the authentication information for the management entity, the plug-in establishing a secured connection with the management entity.

12. The method of claim 11, wherein the request further includes a download address for the plug-in package, and the method further comprises:
the web server transmitting, to the plug-in manager, a request for the download address for the plug-in package and
the web server installing the plug-in.

13. The method of claim 11, wherein the authentication information comprises a thumbprint for the management entity.

14. The method of claim 11, wherein the management entity comprises a virtual appliance implemented as a VM in the VM system or a management server on a virtualization manager in the VM system.

15. The method of claim 11, further comprising:
the plug-in receiving, through the user interface element, input from a browser;
the plug-in providing the input to the management entity over the secured connection;
the plug-in receiving output from the management entity over the secured connection; and
the plug-in updating the user interface element based on the output.

16. The method of claim 11, further comprising:
the plug-in manager receiving, from the management entity, a request to remove the plug-in; and
the plug-in manager sending, to the web server, an instruction to remove the plug-in.

17. A non-transitory, computer-readable storage medium encoded with instructions executable by a processor implementing a plug-in manager in a virtual machine (VM) system to:
receive, from a management entity in the VM system, a request to register or update a plug-in that extends a web server with a user interface element to interact with the management entity, wherein the request includes an address and authentication information for the management entity and a download address for a plug-in package;
record the address and the authentication information;
transmit, to the web server, an instruction to install or update the plug-in;
receive, from the plug-in at the web server, a request for the address and the authentication information for the management entity; and
transmit, to the plug-in at the web server, the address and the authentication information for the management entity.

18. The storage medium of claim 17, wherein the storage medium further comprising instructions executable by the processor to:

receive, from the web server, a request for the download address; and transmit, to the web server, the download address.

19. The storage medium of claim 18, wherein the authentication information comprises a thumbprint for the management entity.

20. The storage medium of claim 18, wherein the management entity comprises a virtual appliance implemented as a VM in the VM system or a management server on a virtualization manager in the VM system.

21. The storage medium of claim 17, further comprising instructions executable by the processor to:

receive, from the management entity, a request to remove the plug-in; and send, to the web server, an instruction to remove the plug-in.

22. A non-transitory, computer-readable storage medium encoded with instructions executable by a processor implementing a web server in a virtual machine (VM) system to:

receive, from a plug-in manager in the VM system, an instruction to install or update a plug-in that extends the web server with a user interface element to interact with a management entity in the VM system;

receive, from the plug-in manager, a download address for a plug-in package;

download the plug-in package for the plug-in based on the download address;

install the plug-in from the plug-in package;

transmit, to the plug-in manager, a request for an address and authentication information for the management entity;

receive, from the plug-in manager, the address and the authentication information for the management entity; and use the address and the authentication information for the management entity to establish a secured connection with the management entity.

23. The storage medium of claim 22, further comprising instructions executable by the processor to:

transmit, to the plug-in manager, a request for the download address for the plug-in package.

24. The storage medium of claim 22, wherein the authentication information comprises a thumbprint for the management entity.

25. The storage medium of claim 22, wherein the management entity comprises a virtual appliance implemented as a VM in the VM system or a management server on a virtualization manager in the VM system.

26. The storage medium of claim 22, further comprising instructions executable by the processor to:

receive, through the user interface element, input from a browser;

provide the input to the management entity;

receive output from the management entity; and update the user interface element based on the output.

* * * * *